(12) United States Patent
Tsai et al.

(10) Patent No.: US 10,983,419 B2
(45) Date of Patent: Apr. 20, 2021

(54) IMAGING MODULES POWER ON VIA ROTATIONS

(71) Applicant: HEWLETT-PACKARD DEVELOPMENT COMPANY, L.P., Houston, TX (US)

(72) Inventors: Ming-Shan Tsai, Taipei (CN); Wei-Chih Tsao, Taipei (CN); Szu-Yu Chen, Taipei (CN)

(73) Assignee: Hewlett-Packard Development Company, L.P., Spring, TX (US)

( * ) Notice: Subject to any disclaimer, the term of this patent is extended or adjusted under 35 U.S.C. 154(b) by 229 days.

(21) Appl. No.: 16/083,106

(22) PCT Filed: Apr. 19, 2017

(86) PCT No.: PCT/US2017/028365
§ 371 (c)(1),
(2) Date: Sep. 7, 2018

(87) PCT Pub. No.: WO2018/194587
PCT Pub. Date: Oct. 25, 2018

(65) Prior Publication Data
US 2020/0301256 A1    Sep. 24, 2020

(51) Int. Cl.
*G03B 17/56* (2006.01)
*G03B 17/02* (2006.01)

(52) U.S. Cl.
CPC ........... *G03B 17/561* (2013.01); *G03B 17/02* (2013.01)

(58) Field of Classification Search
None
See application file for complete search history.

(56) References Cited

U.S. PATENT DOCUMENTS

| | | | |
|---|---|---|---|
| 7,245,482 B2 | 7/2007 | Kim | |
| 7,412,163 B2 | 8/2008 | Wu | |
| 7,489,525 B2 | 2/2009 | Cheng et al. | |
| 8,055,297 B2* | 11/2011 | Guo | H04N 5/2254 455/556.1 |
| 8,432,485 B1 | 4/2013 | Martinez et al. | |
| 2003/0203747 A1* | 10/2003 | Nagamine | H04M 1/0243 455/575.3 |

(Continued)

FOREIGN PATENT DOCUMENTS

| | | |
|---|---|---|
| CN | 102645868 | 8/2012 |
| CN | 206039074 U | 3/2017 |

(Continued)

OTHER PUBLICATIONS

"ASUS VK278Q Monitor—27" FHD (1920×1080), Rotatable Webcam 2.0MP, Speakers", ASUS, Retrieved from internet—https://www.asus.com/us/Commercial-Monitors/VK278Q/, 2015, 3 Pages.

*Primary Examiner* — Cynthia Segura
(74) *Attorney, Agent, or Firm* — HP Inc. Patent Department

(57) ABSTRACT

An example device includes a main housing having a rotation track. The device also includes a camera having a plurality of imaging modules. The camera is attached to the main housing externally. A subset of the plurality of imaging modules is to power on by a rotation of the camera via the rotation track.

17 Claims, 4 Drawing Sheets

(56) References Cited

U.S. PATENT DOCUMENTS

| | | | |
|---|---|---|---|
| 2005/0137001 A1* | 6/2005 | Bell | H04M 1/0225 |
| | | | 455/575.4 |
| 2008/0013262 A1 | 1/2008 | Stanford et al. | |
| 2010/0091178 A1* | 4/2010 | Eromaki | H04N 5/2252 |
| | | | 348/373 |
| 2014/0101578 A1* | 4/2014 | Kwak | G06F 1/1647 |
| | | | 715/761 |
| 2016/0219219 A1 | 7/2016 | Jang et al. | |
| 2018/0054595 A1* | 2/2018 | Odamaki | H04N 5/2251 |
| 2020/0258382 A1* | 8/2020 | Shi | B60W 50/045 |

FOREIGN PATENT DOCUMENTS

| | | |
|---|---|---|
| EP | 2683159 | 1/2014 |
| JP | 10293340 A | 4/1997 |
| JP | 3398008 B2 | 4/2003 |
| JP | 2007059718 A | 3/2007 |
| KR | 20060104571 A | 10/2006 |

\* cited by examiner

IMAGING MODULES POWER ON VIA ROTATIONS

BACKGROUND

Electronic devices, such as notebook computers, All-in-One (AiO) computers, etc., may include communication devices to improve the capabilities of the electronic device. For example, a notebook computer may include a camera that is integrated into a bezel of a display of the notebook computer. A user of the notebook computer may use the integrated camera to conduct video conferencing.

BRIEF DESCRIPTION OF THE DRAWINGS

Some examples of the present application are described with respect to the following figures.

DETAILED DESCRIPTION

Notebook computers, All-in-One (AiO) computers are trending towards slimmer design. For example, the bezel of a display of an AiO computer is getting thinner and thinner. Thus, integrating a camera into the bezel becomes more challenging as there is less room to house the camera.

Examples described herein provide an electronic device with a camera. The camera may be rotatable relative to the electronic device to selectively power on an imaging module of the camera. For example, a device may include a main housing having a rotation track. The device may also include a camera having a plurality of imaging modules. The camera may be attached to the main housing externally. A subset of the plurality of imaging modules may power on via a rotation of the camera via the rotation track.

In another example, a device may include a main housing having a rotation track. The device may also include a power trigger extending from the main housing. The device may further include a camera having a first imaging module and a second imaging module. The camera may be attached to the main housing externally. One of the first imaging module and the second imaging module may engage the power trigger by a rotation of the camera via the rotation track. The engagement may enable the engaged imaging module to power on.

In another example, a device may include a main housing having a set of rotation tracks. The device may also include a camera having a first imaging module positioned towards in a first direction and a second imaging module positioned towards a second direction opposite the first direction. The camera may be attached to the main housing. One of the first imaging module and the second imaging module may power on by a rotation of the camera via the rotation track. In this manner, examples described herein may enable a device to have an attached camera while having a slim profile.

Figure 1A:
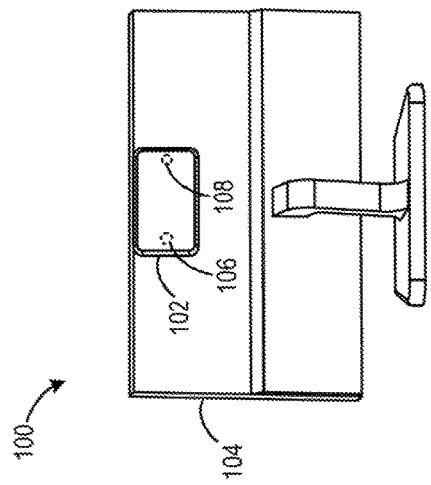
FIG. 1A illustrates a back view of an electronic device having a rotatable camera at a first orientation, according to an example.

FIG. 1A illustrates a back view of an electronic device 100 having a rotatable camera 102 at a first orientation, according to an example. Electronic device 100 may be, for example, a notebook computer, a desktop computer, an All-in-One (AiO) computer, a tablet computing device, a mobile phone, an electronic book reader, a flat-panel display, or any other electronic device having a housing to receive an externally attached camera. For purpose of illustration, electronic device 100 is shown as an AiO computer in the figures.

Camera 102 may be mounted to a backside of main housing 104 of electronic device 100. Thus, camera 102 may be offset from main housing 104. Camera 102 may include a plurality of imaging modules, such as a first imaging module 106 and a second imaging module 108. Imaging sensors of first imaging module 106 and second imaging module 108 may each include a distinct imaging sensor that faces opposite directions to provide different views to a user of electronic device 100. For example, first imaging module 106 may capture front-facing (i.e., point towards the backside of electronic device 100) images and second imaging module 108 may capture rear-facing (i.e., point away from the backside of electronic device 100) images.

Camera 102 may rotate relative to electronic device 100 to change an orientation of camera 102. Depending on a particular orientation, a subset of the plurality of imaging modules may power on or all of the plurality of imaging modules may be powered off. A process of rotating camera 102 is described in more detail in FIG. 4.

Figure 1B:
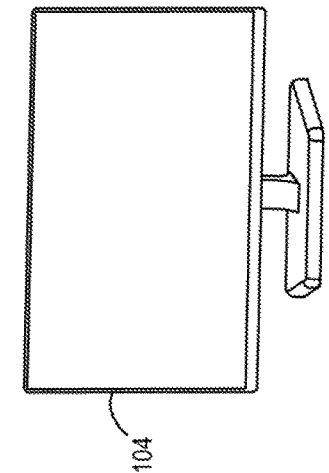
FIG. 1B illustrates a front view of an electronic device having a rotatable camera at the first orientation, according to an example.

In FIG. 1A, camera 102 may be at a first orientation where imaging modules 106 and 108 are both powered off. At the first orientation, imaging modules 106 and 108 may be aligned with main housing 104 so that camera 102 may be hidden from a user's view. Turning to FIG. 1B, FIG. 1B illustrates a front view of electronic device 100 of FIG. 1A having rotatable camera 102 at the first orientation, according to an example. When camera 102 is at the first orientation, imaging modules 106 and 108 may be blocked by main housing 104 so that a user of electronic device 100 may not see camera 102. To start using camera 102, the user may rotate camera 102 to a different orientation so that a subset of imaging modules 106 and 108 may be positioned above main housing 104 for use, as described in more detail in FIGS. 1C-1F.

Figure 1C:
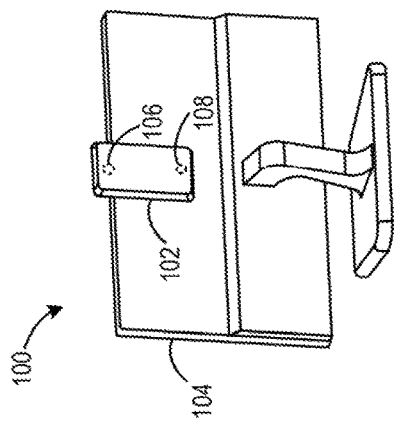
FIG. 1C illustrates a back view of an electronic device having a rotatable camera at a second orientation, according to an example.
Figure 1D:
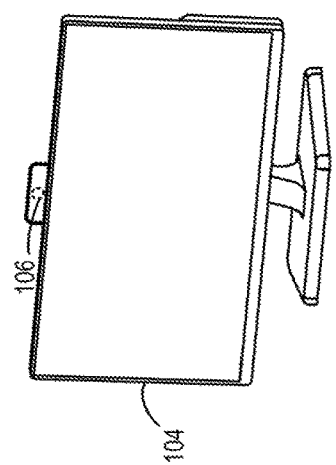
FIG. 1D illustrates a front view of an electronic device having a rotatable camera at the second orientation, according to an example.

Turning to FIG. 1C, FIG. 1C illustrates a back view of electronic device 100 of FIGS. 1A-1B having rotatable camera 102 at a second orientation, according to an example. Camera 102 may be rotated in a clockwise direction 90 degrees to change from the first orientation to a second orientation. Also, when camera 102 is rotated from the first orientation to the second orientation, first imaging module 106 may power on via the rotation. Turning to FIG. 1D, FIG. 1D illustrates a front view of electronic device 100 having rotatable camera 102 at the second orientation, according to an example. At the second orientation, first imaging module 106 may be positioned above main housing 104 for use and may be visible to a user of electronic device 100. Second imaging module 108 may overlap with main housing 104.

Figure 1E:
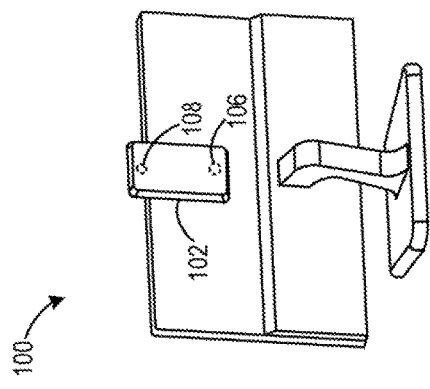
FIG. 1E illustrates a back perspective view of an electronic device having a rotatable camera at a third orientation, according to an example.
Figure 1F:
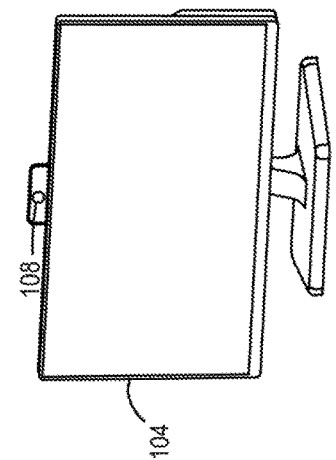
FIG. 1F illustrates a front perspective view of an electronic device having a rotatable camera at the third orientation, according to an example.

Turning to FIG. 1E, FIG. 1E illustrates a back perspective view of electronic device 100 having rotatable camera 102 at a third orientation, according to an example. Camera 102 may be rotated in a counter clockwise direction 90 degrees to change from the first orientation to the third orientation. When camera 102 is rotated from the first orientation to the third orientation, second imaging module 108 may power on via the rotation. Turning to FIG. 1F, FIG. 1F illustrates a front perspective view of electronic device 100 having rotatable camera 102 at the third orientation, according to an example. At the third orientation, second imaging module 108 may be positioned above main housing 104 for use and may be visible to the user of electronic device 100. First imaging module 106 may overlap with main housing 104.

Figure 2B:
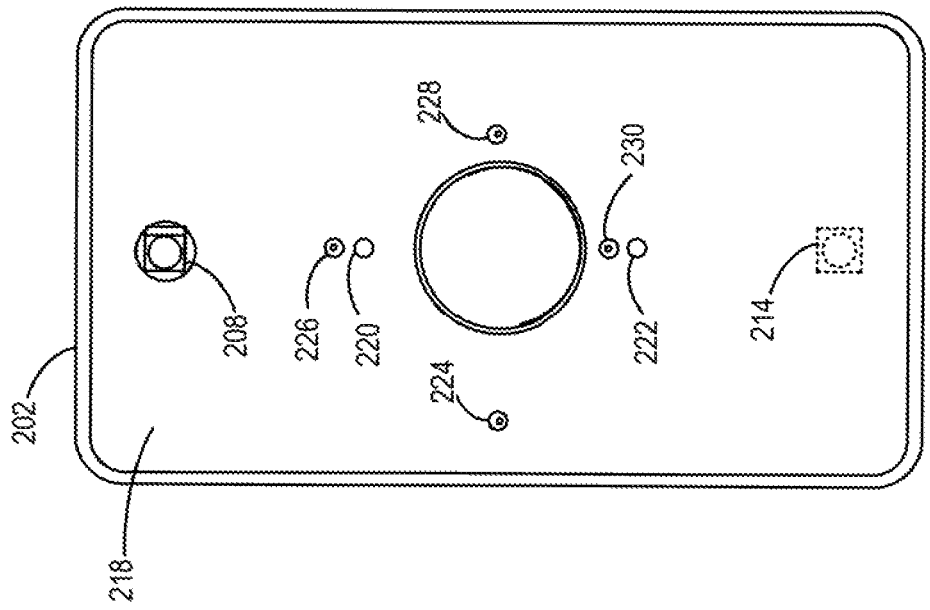
FIG. 2B illustrates a front view of the housing of FIG. 2A, according to an example.
Figure 2A:
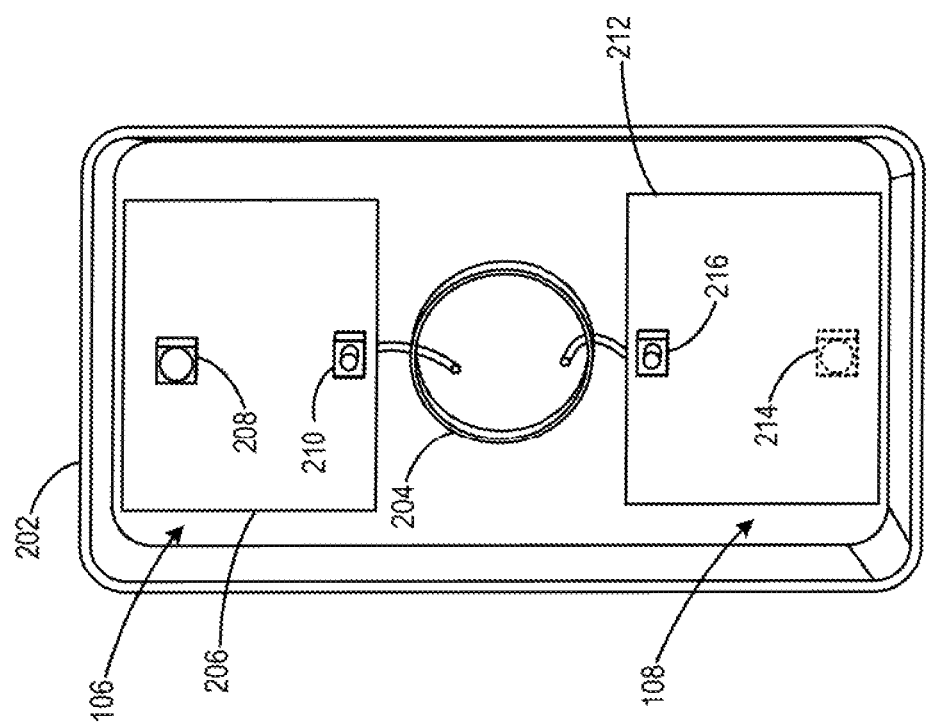
FIG. 2A illustrates an internal view of a housing of the camera of FIGS. 1A-1F where a plurality of imaging modules are located, according to an example.

FIG. 2A illustrates an internal view of a housing 202 of camera 102 of FIGS. 1A-1F where a plurality of imaging modules are located, according to an example. Camera 102 may include a housing 202. Imaging modules 106 and 108 may be located inside housing 202. Housing 202 may also include an opening 204 to receive connections from electronic device, such as a power cable, a data cable, etc. Opening 204 may also be used to attach camera 102 to electronic device 100, as described in more detail in FIG. 3.

First imaging module 106 may include a first circuit board 206, a first imaging sensor 208, and a first power switch 210. First imaging sensor 208 and first power switch 210 may be mounted to first circuit board 206. First imaging sensor 208 and first power switch 210 may be electrically coupled so that first power switch 210 may control whether first imaging sensor 208 receives power from electronic device 100.

Second imaging module 108 may include a second circuit board 212, a second imaging sensor 214, and a second power switch 216. Second imaging sensor 214 and second power switch 216 may be mounted to second circuit board 212. In some examples, second power switch 216 may control whether components (including second imaging sensor 214) mounted to second circuit board 212 are powered on. In some examples, second power switch 216 may control whether second imaging sensor 214 is powered on.

Imaging sensors 208 and 214 may be as complementary metal-oxide-semiconductor (CMOS) imaging sensors, semiconductor charge-coupled devices (CCD) imaging sensors, etc. First imaging sensor 208 may be mounted to first circuit board 206 such that first imaging sensor 208 is positioned or pointed towards a first direction. Second imaging sensor 214 may be mounted to second circuit board 212 such that second imaging sensor 214 is positioned or pointed towards a second direction opposite the first direction.

FIG. 2B illustrates a front view of the housing of FIG. 2A, according to an example. On a front surface 218 of housing 202, contacts 220 and 222 of power switches 210 and 216 respectively may be exposed to engage a power trigger extending from main housing 104. The power trigger is described in more detail in FIG. 4. A plurality of flanges 224, 226, 228, and 230 may extend from front surface 218. Flanges 224, 226, 228, and 230 may help define the amount of rotations of camera 102. Operations of flanges 224, 226, 228, and 230 are described in more detail in FIG. 4.

Figure 3:
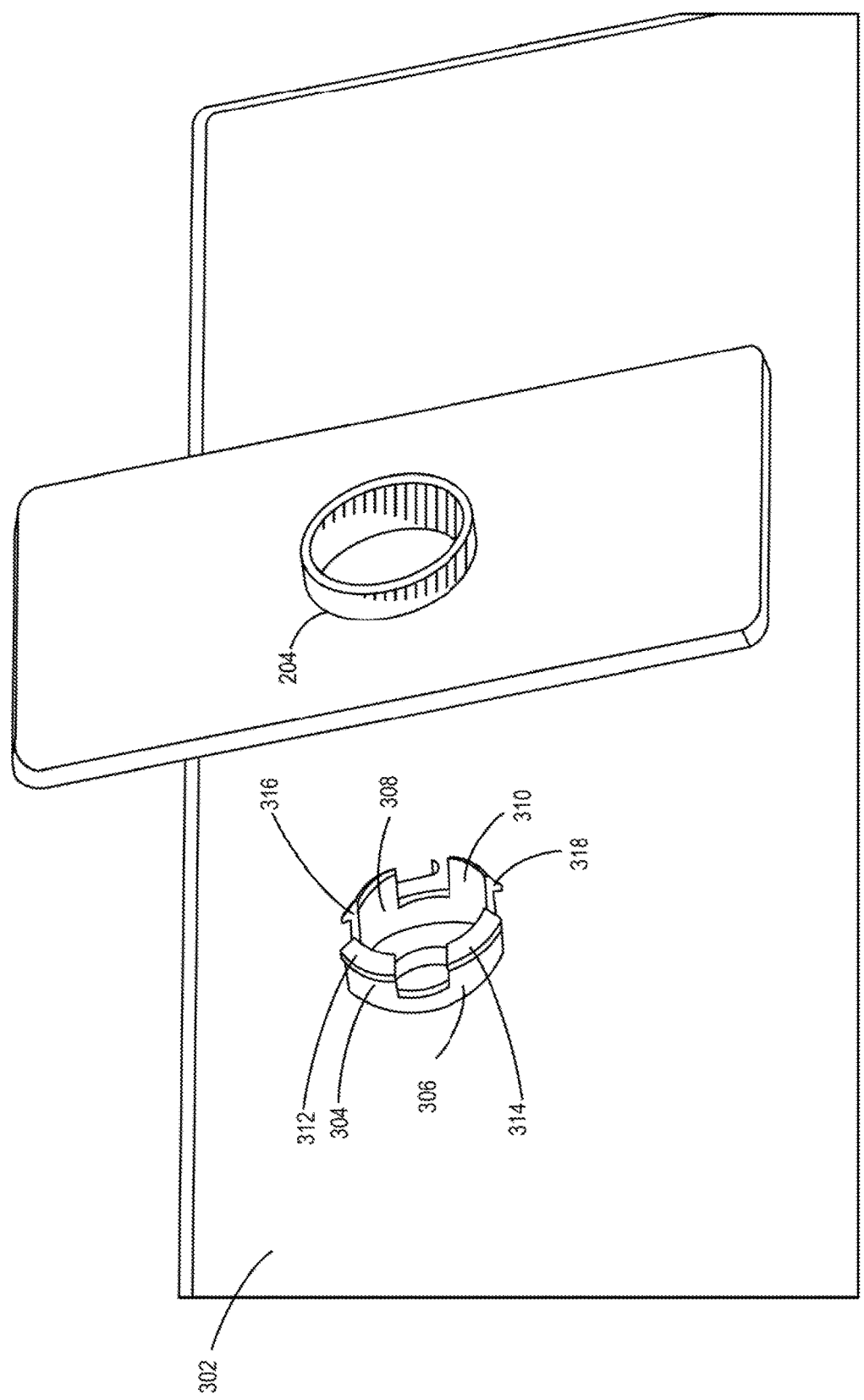
FIG. 3 illustrates a side view of a set of attachment prongs on a back surface of the main housing to attach the camera to the main housing, according to an example.

FIG. 3 illustrates a side view of a set of attachment prongs on a back surface 302 of main housing 104 to attach camera 102 to main housing 104, according to an example. Electronic device 100 may include a set of attachment prongs 304, 306, 308, and 310 that extend from back surface 302. The set of attachment prongs 304, 306, 308, and 310 pass through opening 204 to enable camera 102 to be attached to main housing 104. Each of attachment prongs 304, 306, 308, 310 may include a distinct lip region 312, 314, 316, 318 respectively that secures camera 102 to main housing 104. Although four attachment prongs are shown in FIG. 3, it should be understood any number of attachment prongs can be used.

Figure 4:
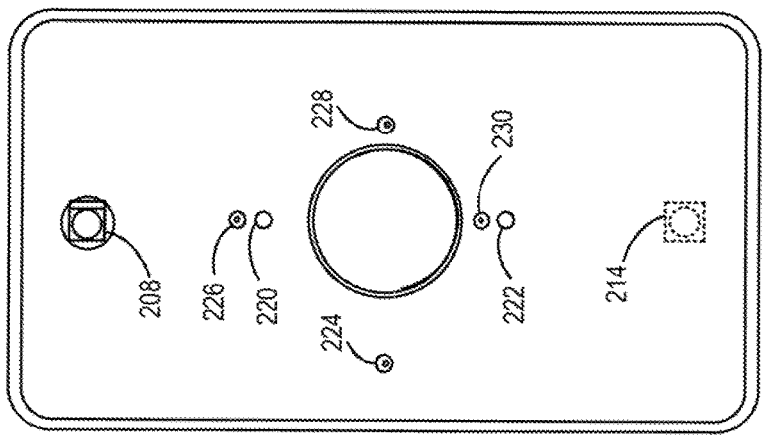
FIG. 4 illustrates a front view of features of the electronic device on the back surface of the main housing to control operations of the camera, according to an example.
Figure 4:
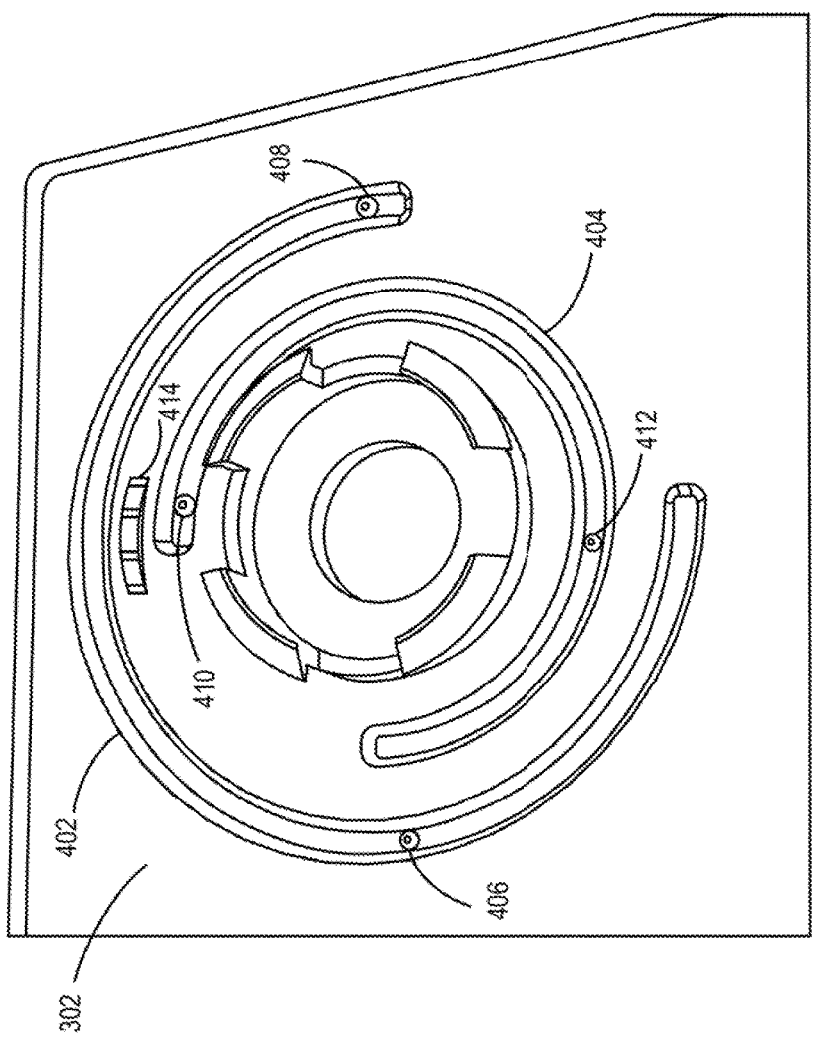

FIG. 4 illustrates a front view of features of electronic device 100 on back surface 302 of main housing 104 to control operations of the camera, according to an example. Electronic device 100 may include a set of rotation tracks to enable camera 102 to rotate relative to main housing 104. The set of rotation tracks may include a first rotation track 402 and a second rotation track 404. Rotation tracks 402 and 404 may be located on back surface 302. The set of rotation tracks 402 and 404 may each have a particular length to define the amount of rotations of camera 102.

First rotation track 402 may include flanges 406 and 408. Second rotation track 404 may include flanges 410 and 412. When camera 102 is attached to main housing 104, flanges 226 and 228 may be positioned within first rotation track 402 and flanges 224 and 230 may be located within second rotation track 404. When camera 102 is rotated to a predefined orientation (e.g., the first orientation, the second orientation, the third orientation). Flanges 224, 226, 228, and 230 may come in contact with flanges 406, 408, 410, and 412. The contact may generate some physical resistance so that a user rotating camera 102 may know that camera 102 is at a predefined orientation.

Electronic device 100 may also include a power trigger 414 that extends from back surface 302. Power trigger 414 may be a mechanical feature that defines at what orientation a particular imaging module of camera 102 is to power on. Power trigger 414 may be located between rotation tracks 402 and 404. An engagement between a particular contact (e.g, contact 220 or 222) and power trigger 414 may enable a corresponding imaging module to power on. For example, when camera 102 is at the first orientation, imaging modules 106 and 108 may be powered off. When camera 102 is rotated from the first orientation to the second orientation, contact 220 may engage power trigger 414 (e.g., power trigger 414 may depress contact 220) to turn on power switch 210. When power switch 210 is turned on, first imaging module 106 may be powered on while second imaging module 108 remains powered off. When camera 102 is rotated to the third orientation from the first orientation, contact 222 may engage power trigger 414 (e.g., power trigger 414 may depress contact 222) to turn on power switch 216. When power switch 216 is turned on, second imaging module 108 may be powered on while first imaging module 106 may be powered off.

The use of "comprising", "including" or "having" are synonymous and variations thereof herein are meant to be inclusive or open-ended and do not exclude additional unrecited elements or method steps.

What is claimed is:
1. A device comprising:
   a main housing having a rotation track and a power trigger; and
   a camera having a plurality of imaging modules comprising a first imaging module and a second imaging module, wherein the camera is attached to the main housing externally and is rotatable with respect to the main housing along the rotation track, wherein the plurality of imaging modules comprise respective contacts,
wherein when the camera is rotated to a first orientation, a first contact of the first imaging module is electrically engaged to the power trigger, and a second contact of the second imaging module is electrically disengaged from the power trigger, and
wherein when the camera is rotated to a second orientation different from the first orientation, the second contact of the second imaging module is electrically engaged to the power trigger, and the first contact of the first imaging module is electrically disengaged from the power trigger.

2. The device of claim 1, wherein the main housing further includes a set of attachment prongs, and wherein the camera is attached to the main housing via the set of attachment prongs.

3. The device of claim 1, wherein the rotation track is a first rotation track along which the camera is to rotate to the first orientation, and wherein the main housing has a second rotation track along which the camera is to rotate to the second orientation.

4. The device of claim 3, wherein the camera is offset from the main housing.

5. The device of claim 3, wherein the power trigger is positioned in a space between the first rotation track and the second rotation track.

6. A device comprising:
a main housing comprising:
a rotation track, and
a power trigger extending from the main housing; and
a camera having a first imaging module and a second imaging module, wherein the camera is attached to the main housing externally, wherein the first imaging module comprises a first power switch having a first contact, and the second imaging module comprises a second power switch having a second contact, wherein the first contact is to engage the power trigger when the camera is rotated along the rotation track to a first orientation, wherein the second contact is to engage the power trigger when the camera is rotated to a second orientation different from the first orientation, and wherein the engagement of the first contact with the power trigger is to power on the first imaging module, and wherein the engagement of the second contact with the power trigger is to power on the second imaging module.

7. The device of claim 6, wherein the first imaging module and the second imaging module are powered off when the camera is rotated to a third orientation different from the first and second orientations.

8. The device of claim 6, wherein the main housing further includes a set of attachment prongs, and wherein the camera is attached to the main housing via the set of attachment prongs.

9. The device of claim 6, wherein the rotation track is a first rotation track, and wherein the main housing has a second rotation track along which the camera is to rotate to the second orientation, the second rotation track being different from the first rotation track.

10. The device of claim 9, wherein the camera is rotatable along the first rotation track in a first rotational direction to the first orientation, wherein the camera is rotatable along the second rotation track in a second rotation direction to the second orientation, and wherein the first rotational direction is opposite the second rotational direction.

11. The device of claim 10, wherein the power trigger is positioned on the main housing in a space between the first rotation track and the second rotation track.

12. A device comprising:
a main housing having a set of rotation tracks; and
a camera attached to the main housing and comprising having:
a first imaging module having a first imaging sensor, wherein the first imaging sensor faces a first direction; and
a second imaging module having a second imaging sensor, wherein the second imaging sensor faces a second direction opposite the first direction, wherein the camera is rotatable in a first rotational direction along a first rotation track of the set of rotation tracks, to power on the first imaging module and wherein the camera is rotatable in a second rotational direction along a second rotation track of the set of rotation tracks, to power on the second imaging module, wherein the first rotational direction is different from the second rotational direction, and the first rotation track is different from the second rotation track.

13. The device of claim 12, wherein the main housing has a power trigger, the first imaging module has a first contact, and the second imaging module has a second contact, wherein the first contact is to engage the power trigger when the camera is rotated along the first rotation track to a first orientation, wherein the second contact is to engage the power trigger when the camera is rotated along the second rotation track to a second orientation different from the first orientation, and wherein the engagement of the first contact with the power trigger is to power on the first imaging module, and wherein the engagement of the second contact with the power trigger is to power on the second imaging module.

14. The device of claim 13, wherein the second contact is disengaged from the power trigger when the camera is rotated to the first orientation, and the first contact is disengaged from the power trigger when the camera is rotated to the second orientation.

15. The device of claim 12, wherein the main housing further includes a set of attachment prongs, and wherein the camera is attached to the main housing via the set of attachment prongs.

16. The device of claim 15, wherein the power trigger is positioned on the main housing in a space between the first rotation track and the second rotation track.

17. The device of claim 12, wherein the first imaging module and the second imaging module are to power on via a mechanical feature of the main housing.

* * * * *